US010135695B1

(12) United States Patent
Zlatnik et al.

(10) Patent No.: US 10,135,695 B1
(45) Date of Patent: Nov. 20, 2018

(54) SYSTEM AND METHOD FOR MANAGING A REMOTE DEVICE

(71) Applicants: Pavel Zlatnik, Prague (CZ); Daniel Samek, Prague (CZ); Michal Navrkal, Prague (CZ); Liborio Carlos Garcia Chaparro, Prague (CZ)

(72) Inventors: Pavel Zlatnik, Prague (CZ); Daniel Samek, Prague (CZ); Michal Navrkal, Prague (CZ); Liborio Carlos Garcia Chaparro, Prague (CZ)

(73) Assignee: CA, Inc., New York, NY (US)

( * ) Notice: Subject to any disclaimer, the term of this patent is extended or adjusted under 35 U.S.C. 154(b) by 437 days.

(21) Appl. No.: 13/854,636

(22) Filed: Apr. 1, 2013

(51) Int. Cl.
*H04L 12/24* (2006.01)
*H04L 29/08* (2006.01)

(52) U.S. Cl.
CPC ............ *H04L 41/22* (2013.01); *H04L 67/125* (2013.01)

(58) Field of Classification Search
CPC ..... H04L 67/02; H04L 67/025; H04L 67/125; H04L 67/22
See application file for complete search history.

(56) References Cited

U.S. PATENT DOCUMENTS

| | | | | |
|---|---|---|---|---|
| 5,317,566 A | * | 5/1994 | Joshi | H04Q 3/66 370/238 |
| 2006/0156361 A1 | * | 7/2006 | Wang | H04N 7/186 725/105 |
| 2010/0110932 A1 | * | 5/2010 | Doran | H04L 41/22 370/254 |
| 2010/0121948 A1 | * | 5/2010 | Procopio | 709/224 |
| 2010/0299741 A1 | * | 11/2010 | Harrison | H04L 63/0281 726/12 |
| 2010/0328097 A1 | * | 12/2010 | Leo | G01D 15/00 340/870.02 |

FOREIGN PATENT DOCUMENTS

WO    WO 2006080792 A1  *  8/2006

OTHER PUBLICATIONS

Lydia Parziale, David T. Britt, Chuck Davis, Jason Forrester, Wei Liu, Carolyn Matthews, and Nicholas Rosselot, "TCP/IP Tutorial and Technical Overview," IBM Redbooks, International Technical Support Organization, dated Dec. 2006, available at http://www.redbooks.ibm.com/redbooks/pdfs/gg243376.pdf (searched on Jul. 1, 2013).

(Continued)

*Primary Examiner* — Tonia L Dollinger
*Assistant Examiner* — Albert Chiou
(74) *Attorney, Agent, or Firm* — Baker Botts L.L.P.

(57) ABSTRACT

Methods include presenting one or more actions that correspond to each of one or more remote devices. In addition, the methods comprise receiving a selection. The selection comprises an action selected from the one or more actions, wherein the action corresponds to a particular remote device in the one or more remote devices. The methods further comprise retrieving identification data for the particular remote device. The methods also include generating a packet, wherein the packet comprises the identification data and a command corresponding to the action. The methods further comprise transmitting the packet to the particular remote device.

21 Claims, 5 Drawing Sheets

(56) References Cited

OTHER PUBLICATIONS

Marton Anka, "join.me Architecture Whitepaper," LogMeIn, Inc., published 2012, available at https://join.me/ (searched on Jul. 1, 2013).
"LogMeIn Backup User Guide," LogMeIn, Inc., published 2013, available at https://secure.logmein.com/welcome/documentation/EN/pdf/Backup/LogMeIn_Backup_UserGuide.pdf (searched on Jul. 1, 2013).
"LogMeIn Central User Guide," LogMeIn, Inc., published 2013, available at https://secure.logmein.com/welcome/documentation/EN/pdf/Central/LogMeIn_Central_UserGuide.pdf (searched on Jul. 1, 2013).
"LogMeIn Free User Guide," LogMeIn, Inc., published 2013, available at https://secure.logmein.com/welcome/documentation/EN/pdf/Free/LogMeIn_Free_UserGuide.pdf (searched on Jul. 1, 2013).
"LogMeIn Himachi User Guide," LogMeIn, Inc., published 2013, available at https://secure.logmein.com/welcome/documentation/EN/pdf/Hamachi/LogMeIn_Hamachi_UserGuide.pdf (searched on Jul. 1, 2013).
"Ignition for Windows User Guide," LogMeIn, Inc., published 2013, available at https://secure.logmein.com/welcome/documentation/EN/pdf/Ignition/LogMeIn_Ignition_UserGuide.pdf (searched on Jul. 1, 2013).
"LogMeIn Pro User Guide," LogMeIn, Inc., published 2013, available at https://secure.logmein.com/welcome/documentation/EN/pdf/Pro/LogMeIn_Pro_UserGuide.pdf (searched on Jul. 1, 2013).
"LogMeIn Rescue Administration Center User Guide," LogMeIn, Inc., published 2013, available at https://secure.logmeinrescue.com/welcome/documents/pdfs/rescue_admin_center_userguide.pdf?ubecarna= (searched on Jul. 1, 2013).
"LogMeIn Rescue Technician Console User Guide," LogMeIn, Inc., published 2013, available at https://secure.logmeinrescue.com/welcome/documents/pdfs/rescue_tech_console_userguide.pdf?ubecarna= (searched on Jul. 1, 2013).
"RemotelyAnywhere 10 User Guide," LogMeIn, Inc., published 2013, available at http://remotelyanywhere.com/remotelyanywhere_guide.pdf (searched on Jul. 1, 2013).
"The Cosm Project," Mithral Inc., available at http://www.mithral.com/cosm/ (searched on Jul. 1, 2013).
"Hi, we're Cubby," LogMeIn, Inc., available at https://www.cubby.com/cubby/ (searched on Jul. 1, 2013).
"How to Wake a Computer in Sleep Mode or Powered Off Using Wake on LAN," LogMeIn Central User Guide, LogMeIn, Inc., available at https://secure.logmein.com/welcome/Webhelp/CentralUserGuide/LogMeIn/t_host_preferences_WakeonLAN.html (searched on Jul. 1, 2013).
"LogMeIn Pro Features," LogMeIn, Inc., available at https://secure.logmein.com/products/pro/features.aspx (searched on Jul. 1, 2013).
"MCServer," replace.net, available at http://software.resplace.net/MCServer/ (searched on Jul. 1, 2013).
"Wake on LAN Tool," Free Windows Admin Tools, ManageEngine, available at http://www.manageengine.com/products/free-windows-tools/free-wake-on-lan-tool.html (searched on Jul. 1, 2013).
"Cosm (software)," May 16, 2013, Wikipedia: The Free Encyclopedia, Wikimedia Foundation, Inc., available at http://en.wikipedia.org/wiki/Cosm_%28software%29 (searched on Jul. 1, 2013).

* cited by examiner

SYSTEM AND METHOD FOR MANAGING A REMOTE DEVICE

BACKGROUND

The present disclosure relates to cloud computing and, more specifically, to a system and method for managing a remote device.

In cloud computing, existing information technology ("IT") service and asset management systems may allow a user to manage a device that resides in a network. Typically, in order for these systems to function, the user may have to provide the systems with identification information or data for the device. For example, some existing systems may require a user to enter an Internet Protocol ("IP") address or a Media Access Control ("MAC") address for the device. In addition, these systems may only work for users who have network administration rights or whole network access. In more sophisticated systems, the user may only need to have access to another device that resides in the network comprising the device. However, even these sophisticated systems may be ill-equipped to help users manage a group or plurality of devices, especially if each of the plurality of devices is connected to a different network. Moreover, these systems and others may not provide a user with a method to manage a device that resides in a remote network.

BRIEF SUMMARY

According to an aspect of the present disclosure, a method may comprise presenting one or more actions that correspond to each of one or more remote devices. The method may comprise receiving a selection. The selection may comprise an action selected from the one or more actions, wherein the action corresponds to a particular remote device in the one or more remote devices. The method may comprise retrieving identification data for the particular remote device. The method may comprise generating a packet, wherein the packet comprises the identification data and a command corresponding to the action. The method may comprise transmitting the packet to the particular remote device.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
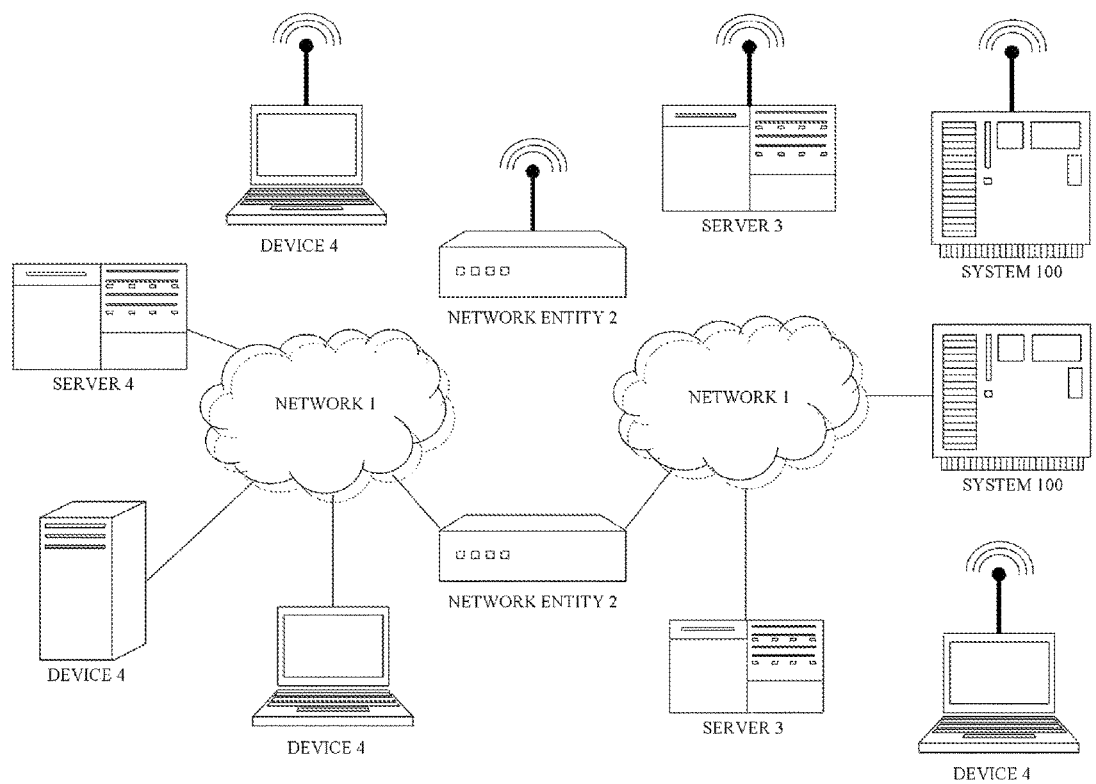
FIG. 1 is a schematic representation of an environment for managing a remote device.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to IT service and asset management in cloud computing, systems and methods disclosed herein may be related to emerging technologies in cloud computing, as well as usability and user experience in middleware or common services and resource management in storage and recovery management.

Referring now to IT service and asset management systems, existing systems may allow a user to manage a device that resides in a network. However, these existing systems may require a user to be a network administrator or to have access to the whole network. Consequently, a user that does not have network administrative rights or whole network access would not be able to use these existing systems to manage the device. Furthermore, other existing systems may require the user to know an IP address, a MAC address, or other identification data for the device. Such identification data may be difficult to remember or not easily accessible to the user. Additionally, such identification data may change over a period of time. Thus, the user may find it inefficient and demanding to use such existing systems. Moreover, certain existing systems may also require the user to manage the device from the same or local network that the device is located in. Other existing systems may require the device to have particular software installed in order to allow the user to remotely manage the device (e.g., remotely power on the device). Systems and methods disclosed herein may provide the user with a method to manage a device that resides in a remote network without requiring the user to have network administrative rights or remember specific identification data.

Systems and methods disclosed herein may comprise a web application with a user interface. The web application may run on a server. Such systems and methods may not require the user to manage a device from a local office network. In addition, such systems and methods may not require particular software to be installed on the device. In the user interface, the user may log in to the web application using a personal username and a corresponding password. After logging into the web application, the user may be presented with a defined list of available devices. These available devices may comprise devices that the user has privileges to manage. For example, if the user only has privileges to manage and use his personal computer ("PC"), he may be presented with a defined list of one device, namely, his PC. However, if the user has privileges to manage more than one device, for example, a group PC and his PC, then the user may be presented with a defined list of two devices, namely, the group PC and his PC. A particular device may be presented in defined lists to more than one user. For example, in the last example, the group PC may be presented in defined lists to the user and a number of other individuals who also belong to a group that the group PC corresponds to.

In such systems and methods, the server running the web application may also use existing backend technology (e.g., Wake On LAN signals, Virtual Local Area Network ("VLAN") technology) to obtain status data for the available devices. Such status data may comprise a status state, for example, powered on, powered off, or not accessible. In the user interface, the server running the web application may present the status data for the available devices to the user. For example, the server may use a green icon to inform the user that a particular available device is powered on, a red icon to inform the user that a particular available device is powered off, and a black icon to inform the user that a particular available device is not accessible. The server may then present the user with available actions that correspond to each of the available devices. These available actions may comprise, for example, turning or powering on a device, restarting a device abruptly or cold restarting a device, and powering off a device abruptly or cold powering off a device. The user may then make a selection, the selection comprising an action chosen from the available actions, wherein the action corresponds to a particular available device in the defined list of available devices. The particular device may be located in a remote network or, stated differently, in a network that is separate from the network that the server is located in. Such systems and method may then implement the action in the particular available device.

If the user made a selection comprising the action of powering on a device, then after the action has been implemented in the particular available device, the user may subsequently access the particular available device by logging into the remote network and using a remote desktop connection to connect to the particular available device. The user may then complete a series of tasks on the particular available device. After completing this series of tasks, the user may once again use the server to manage the particular available device, for instance, to power off the particular available device.

In such systems and methods, implementing the action in the particular available device may comprise generating a packet, wherein the packet comprises identification data corresponding to the particular identified device and a command correspond to the action, and mapping or moving the packet to a network entity that has administrative rights to forward or deliver the packet. As described above, the web application may require the user to login using a personal username and a corresponding password, but the web application may not require the user to have administrative rights in order to access an available device. Instead, the user may be presented with a user perspective comprising a defined list of available devices. Therefore, after the user makes a selection and the packet is generated, such systems and method may transmit the packet to such a network entity. This network entity may comprise, for example, a router or a switch.

In such systems and methods, the server running the application may be referred to as the "main server." As described above, the main server may have access to the remote network that the particular available device is located in. Stated differently, the main server may serve as a bridge between the user interface and one or more network entities. In addition to allowing the user to manage the particular available device, the main server may be equipped to obtain statistics about the particular available device as well as other devices.

Alternatively, in such systems and methods, the web application may run on an advance router instead of a server. The advanced router may comprise a router that supports web applications with user interfaces. The advance router may not require the user to have administrative rights in order to manage the particular available device. With VLAN technology, the advanced router may function by itself to implement the action in the particular available device. Without VLAN technology, the advanced router may function with other network entities, including other advanced routers, to implement the action in the particular available device.

The systems and methods disclosed herein may reduce energy consumption. For example, a user may keep a device powered off and only turn on the device when the user needs to access the device. By reducing energy consumption, such systems and methods may decrease economic costs and promote energy-saving choices. Moreover, such systems and methods may allow a user to leave a device in a secure location such as, for example, an office. This may allow the user to reduce the risk of damaging the device and the risk of losing confidential data that is located on the device. Because the user can manage the device from a remote location, the user may no longer need to carry the device with him when he leaves his office. Furthermore, such systems and methods may allow a user to manage a device that is in a geographic location that is far away from where the user is located. For example, a user that is located in Prague, Czech Republic may be able to turn on a device that is located in Plano, Tex., United States. In addition, as more and more users start to use hybrid devices (i.e., devices with more features and functions but lower performance capabilities such as, for example, a tablet or a smartphone), such systems and methods may allow user to use these hybrid devices as remote connectors that enable them to access one or more higher performance devices.

The systems and methods may also allow a user to remotely monitor the performance of a task. For example, a user may want to monitor the performance of a printer. The printer may be a 3D printer (i.e., a printer that creates three dimensional objects) with a LAN expansion and a network controller that is connected to a power supply. The user may have remotely powered on the printer and instructed the printer to perform a task such as creating an object. The user may then remotely power on a camera and use the camera to monitor the printer. The camera may be connected to a network device or be a standalone camera with a network card. The user may monitor the printer as it performs the task. If the user determines that the printer is having a problem performing the task, then the user may power off the printer to save printing materials (e.g., filaments). Alternatively, the user may check in on the printer after the user believes that the printer has finished performing the task. If the user determines that the printer has finished performing the task, then the user may remotely power off the printer and the camera. Additionally, the user may determine whether the created object meets one or more requirements via a visual inspection before powering off the printer and the camera.

Referring now to FIG. 1, an environment for managing a remote device now is described. The environment may be a cloud environment. The environment may comprise one or more networks 1. In certain configurations, a network 1 may be a LAN, such as an intranet. In some configurations, a network 1 may be a closed, private network, and in other configurations, a network 1 may be an open network. In other configurations, a network 1 may be a virtual local area network (VLAN). Networks 1 may facilitate wired or wireless communications of information and provisioning of services among service providers, information providers, and users that are connected to networks 1.

One or more servers 3 may be connected to networks 1. One or more devices 4 may also be connected to networks 1. Moreover, one or more network entities 2 may connect and forward information among networks 1, servers 3, devices 4, and service providers, information providers, and users that utilize networks 1, servers 3, and devices 4. Service providers may provide services to users utilizing the one or more servers 3, which connect to the one or more devices 4 via networks 1 and network entities 2. The services may comprise, for example, IT services, management services, access services, monitoring services, computing services, and other resource-provisioning services. Network entities 2 may comprise routers, switches, gateways, bridges, and other entities that create or facilitate internetwork connections. Servers 3 may comprise, for example, one or more of general purpose computing devices, specialized computing devices, mainframe devices, wired devices, wireless devices, monitoring devices, infrastructure devices, and other devices configured to provide one or more of services to users. Devices 4 may comprise, for example, one or more of general purpose computing devices, specialized computing devices, mobile devices, wired devices, wireless devices, passive devices, routers, switches, mainframe devices, monitoring devices, infrastructure devices, and other devices utilized by users. Exemplary items may include networks 1, network entities 2, servers 3, and devices 4.

Moreover, a system 100 may be connected to a network 1. System 100 may collect information from and about servers 3, devices 4, and other devices connected to the network 1 and other networks 1. Other networks 1 may comprise networks 1 that System 100 is not connected to. System 100 may be, for example, one or more of a general purpose computing device, a specialized computing device, a wired device, a wireless device, a mainframe device, an infrastructure device, a monitoring device, and any other device configured collect data from one or more data sources (e.g., servers, sensors, networks, interfaces, other devices). System 100 may connect to the network 1 and monitor servers 3, devices 4, and other devices connected to the network 1 and other networks 1 for available information (e.g., performance information, access information, user information, status data, physical conditions, ambient conditions, location and geography, availability, and other variable information) from or about servers 3, devices 4, and other devices connected to the network 1 or other networks 1. By collecting this available information, system 100 may identify one or more remote devices that are assigned to a user. The one or more remote devices may comprise devices 4 and other devices that are connected to other networks 1. System 100 may also obtain status data for each of the one or more remote devices, wherein the status data corresponds to a status of each remote device. Moreover, system 100 may retrieve identification data for a particular remote device (described below).

In some configurations, one or more of servers 3 and devices 4 may comprise system 100. In other configurations, system 100 may be separate from servers 3 and devices 4.

Figure 2:
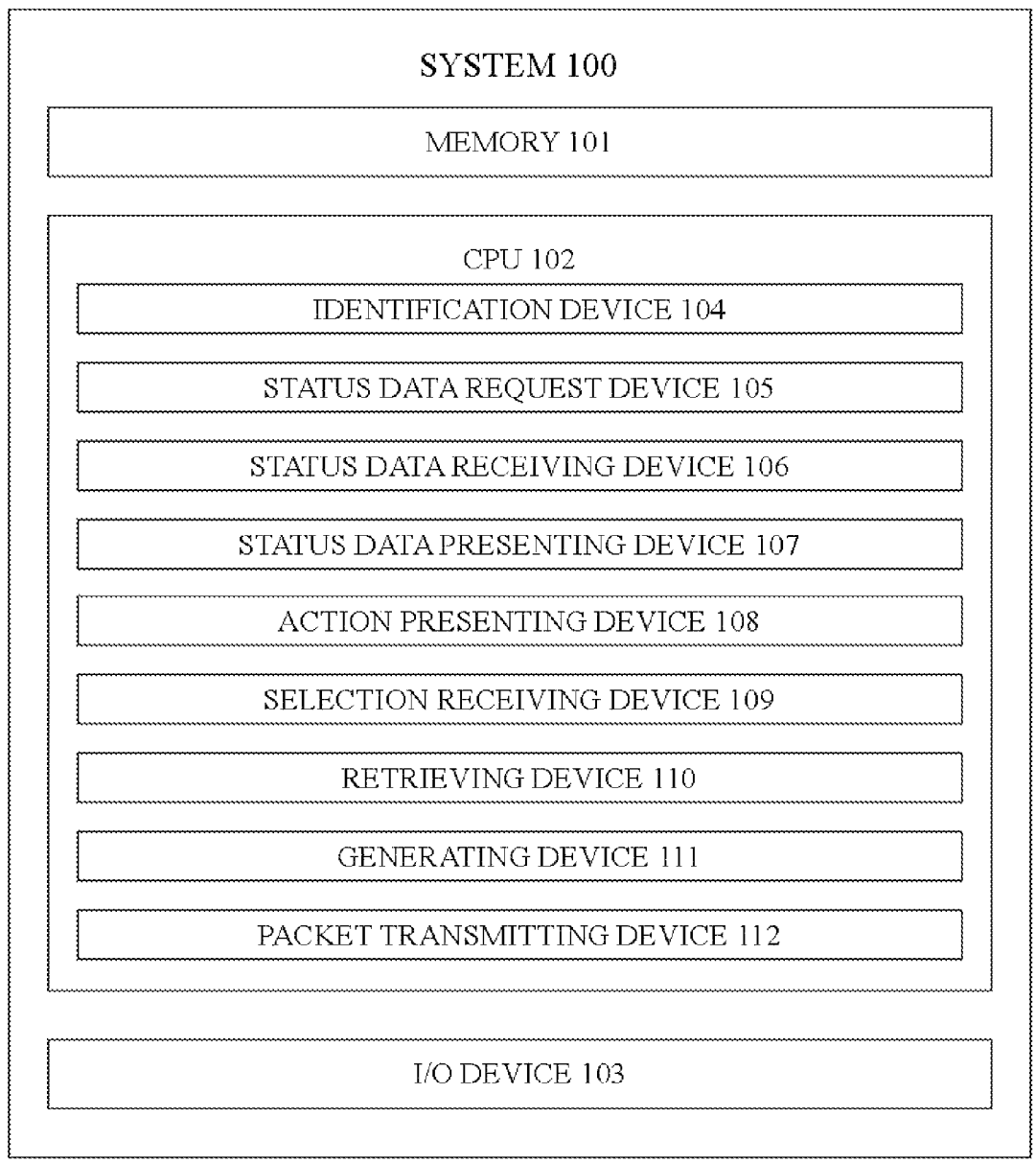
FIG. 2 is a schematic representation of a system configured to manage a remote device.

Referring now to FIG. 2, system 100, which may manage a remote device, is now described. System 100 may reside on one or more networks 1. System 100 may comprise a memory 101, a central processing unit ("CPU") 102, and an input and output ("I/O") device 103. Memory 101 may store computer-readable instructions that may instruct system 100 to perform certain processes. In particular, when executed by CPU 102, the computer-readable instructions stored in memory 101 may instruct CPU 102 to operate as one or more of an identification device 104, a status data request device 105, a status data receiving device 106, a status data presenting device 107, an action presenting device 108, a selection receiving device 109, a retrieving device 110, a generating device 111, and a packet transmitting device 112. In particular configurations, one or more of identification device 104, status data request device 105, status data receiving device 106, status data presenting device 107, action presenting device 108, selection receiving device 109, retrieving device 110, generating device 111, and packet transmitting device 112 may be implemented on one or more different CPUs, which may be comprised in local or remote devices.

I/O device 103 may receive one or more of data from networks 1, data from other devices and sensors connected to system 100, and input from a user and provide such information to CPU 102. I/O device 103 may transmit data to networks 1, may transmit data to other devices connected to system 100, and may transmit information to a user (e.g., display the information, send an e-mail, make a sound). Further, I/O device 103 may implement one or more of wireless and wired communication between system 100 and other devices.

Figure 3:
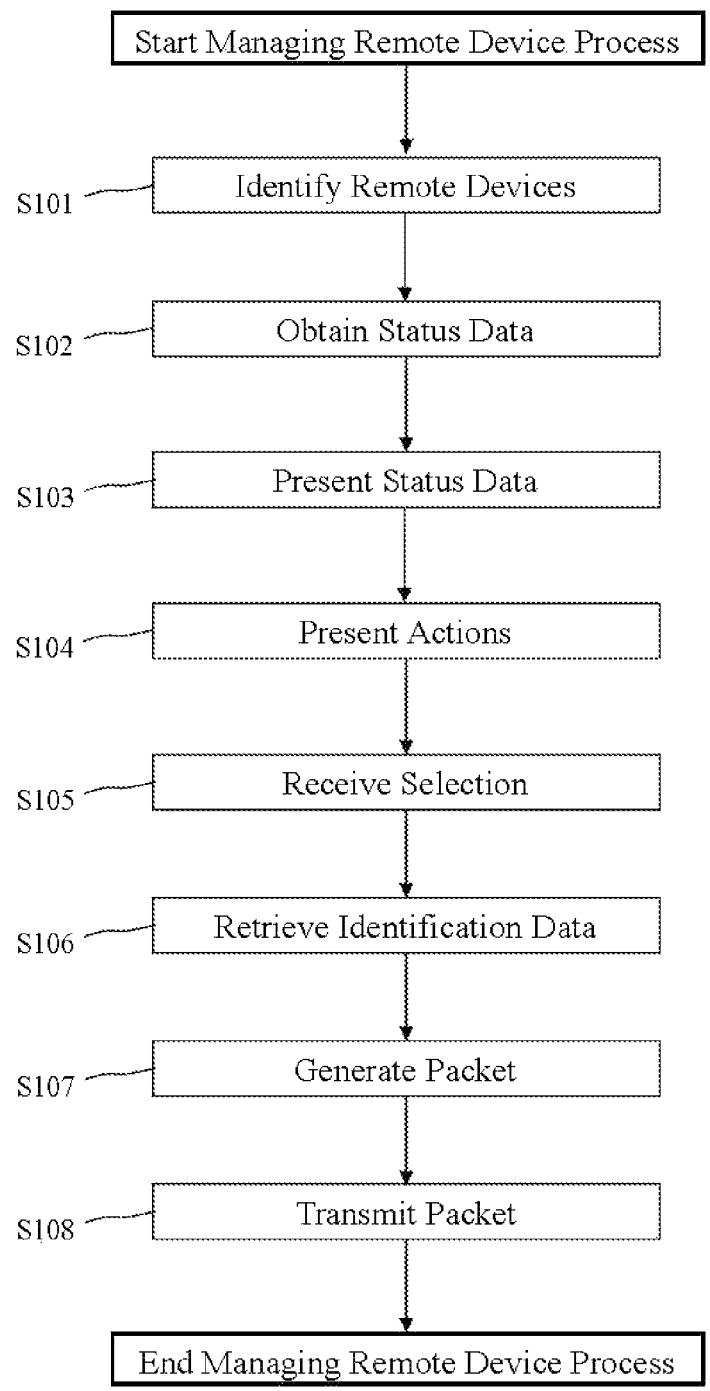
FIG. 3 illustrates a process of managing a remote device.
Figure 4:
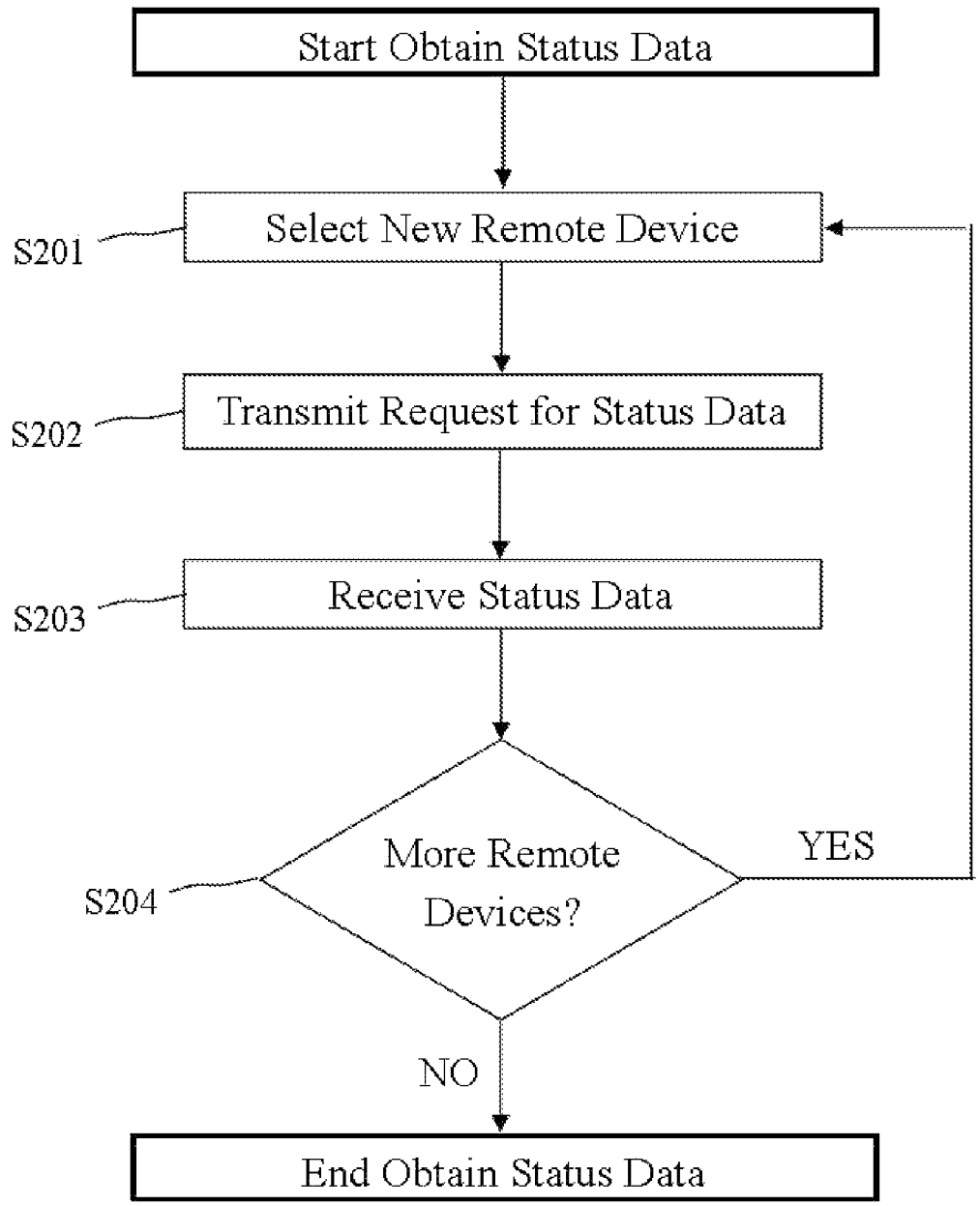
FIG. 4 illustrates a process of obtaining status data.
Figure 5:
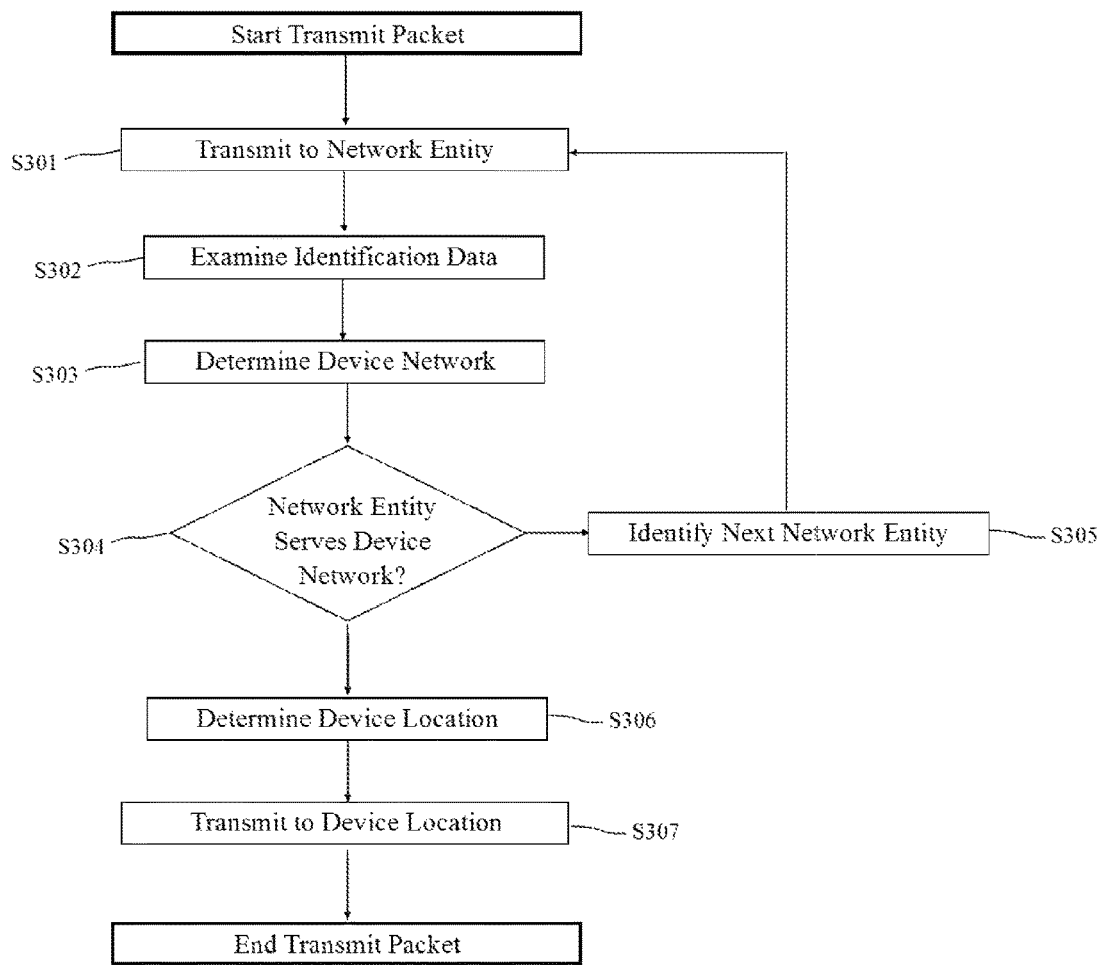
FIG. 5 illustrates a process of transmitting a packet to a particular remote device.

Referring now to FIGS. 3-5, processes performed by identification device 104, status data request device 105, status data receiving device 106, status data presenting device 107, action presenting device 108, selection receiving device 109, retrieving device 110, generating device 111, and packet transmitting device 112 are now described. FIG. 3 depicts a process of managing a remote device comprising identifying one or more remote devices, obtaining status data, presenting the status data and one or more actions to a user, receiving a selection from the user, retrieving identification data for a particular remote device, generating a packet, and transmitting the packet to the particular remote device. In S101, identification device 104 may identify one or more remote devices that are assigned to a user. The one or more remote devices may comprise a computer (a server, a workstation, a PC), an appliance (e.g., a home appliance, a computer appliance), or other device that has a network card or controller (e.g., a wired network card, a wireless network card, an Arduino board or similar controller built onto a circuit board). For example, the one or more remote devices may comprise a printer, a dishwasher, or a light switch that has an Arduino board with a LAN expansion card. Identifying the one or more remote devices that are assigned to a user may involve referencing a user selection list that comprises a list of remote devices that the user is allowed to manage. The one or more remote devices may be added to the user selection list by a network administrator or by an automated process such as, for example, a process where user and device data is collected from a company database (e.g., a Lightweight Directory Access Protocol ("LDAP") database, an Active Directory database). The one or more remote devices may reside on one or more remote networks 1, wherein the one or more remote networks comprise networks that are different from the one or more networks 1 that system 100 resides on. In certain configurations, the one or more remote devices may reside on a same remote network 1. In other configurations, the one or more remote devices may each reside on a different remote network 1.

In S102, for each of the one or more remote devices, status data request device 105 and status data receiving device 106 may obtain status data corresponding to a status of the remote device. Specifically, for each of the one or more remote devices, status data request device 105 may transmit a signal or message to each remote device, wherein the message comprises a request for status data corresponding to a status of each remote device; and status data receiving device 106 may receive a response from each remote device, wherein the response comprises the status data. The status data may comprise at least one of a status state; a statistic corresponding to a metric related to a status of a remote device, wherein the metric comprises an amount of time that the status of the remote device has been set to a status state; a response time for a remote device; and a location of a remote device (e.g., a location based on an IP address). The status of the remote device may comprise a power status, a connection status, or an operating status. The status state may comprise a status state for a power status (e.g., powered on, powered off), a status state for a connection status (e.g., connected to a network, not connected to a network), a status state for an operating status (e.g., CPU utilization, memory utilization), or a status state for completing or finishing a task (e.g., task completing, task completed, task incomplete). The statistic may comprise an average statistic (e.g., a mean, a median, a mode), an order statistic (e.g., a minimum, a maximum, a quantile), or a dispersion statistic (e.g., standard deviation, range).

In S103, status data presenting device 107 may present the status data to the user. In certain configurations, presenting the status data to the user may comprise transmitting the status data to a device 4 or other device that is being utilized by the user. The device 4 or other device may comprise a user interface. The user may be using the device 4 or other device to transmit data to and receive data from system 100, wherein such data comprises status data. In other configurations, presenting the status data to the user may comprise transmitting the status data directly to the user. Status data presenting device 107 may, for example, comprise a user interface and directly display the status data to the user. As another example, status data presenting device 107 may send an e-mail to the user, wherein the e-mail comprises the status data. In S104, action presenting device 108 may present one or more actions that correspond to each of the one or more remote devices. Presenting the one or more actions may comprise a process similar to presenting the status data to the user (e.g., transmitting the one or more actions to a device 4 or other device that is being utilized by the user, transmitting the one or more actions directly to the user). These one or more actions may comprise setting the status of a remote device to a status state. When the status of the remote device comprises a power status, the one or more actions may comprise powering on the remote device (i.e., setting the power status of the remote device to powered on) and powering off the remote device (i.e., setting the power status of the remote device to powered off). These one or more actions may further comprise restarting a remote device.

In S105, selection receiving device 109 may receive from the user a selection. The selection may comprise an action selected from the one or more actions, wherein the action corresponds to a particular remote device in the one or more remote devices. In S106, retrieving device 110 may retrieve identification data for the particular remote device. The identification data may comprise at least one of an IP address, a MAC address, a DNS address, a gateway address, and a VLAN identifier. In S107, generating device 111 may generate a packet in a first network 1. The packet may comprise the identification data and a command corresponding to the action. In S108, packet transmitting device 112 may transmit the packet to the particular remote device. The command, when received by the particular remote device, may cause the particular remote device to implement the action. For example, if the command corresponds to an action to power on the particular remote device, then when the particular remote device receives the action, the command may cause the particular remote device to power on. The particular remote device may be located in a second network 1. The second network 1 may be different from the first network 1. For example, the second network 1 may comprise a LAN that is not connected to the first network 1.

Referring to FIG. 4, which provides a detailed view of S102, status data request device 105 and status data receiving device 106 may obtain status data corresponding to a status of the remote device. In S201, identification device 104 may select a first remote device from the one or more remote devices. In S202, status data request device 105 may transmit a message to the first remote device, wherein the message comprises a request for status data corresponding to a status of the first remote device. The status data, as described above, may comprise at least one of a status state; a statistic corresponding to a metric related to a status of a remote device, wherein the metric comprises an amount of time that the status of the remote device has been set to a status state; a response time for a remote device; and a location of a remote device. In S203, status data receiving device 106 may receive a response from each remote device, wherein the response comprises the status data. In S204, identification device 104 may determine whether there are more remote devices. If identification device 104 determines that there are more remote devices (S204: YES), then the process may proceed back to S201 and identification device 104 may select a new remote device. If identification device 104 determines that there are no other remote devices (S204: NO), then the process may terminate.

Referring now to FIG. 5, which provides a detailed view of S108, packet transmitting device 112 may transmit a packet to a particular remote device. Transmitting the packet to the particular remote device may comprise using one or more network entities to deliver the packet to the particular remote device. The one or more network devices may be configured to examine the identification data, determine a destination for the packet in response to examining the identification data, and transmit the packet to the destination. The destination may comprise a device network and a device location.

As described above, generating device 111 may generate the packet in a first network 1. The packet may comprise identification data. For example, the packet may comprise a header, wherein the header comprises the identification data. The identification data may comprise at least one of an IP address, a MAC address, a DNS address, a gateway address, and a VLAN identifier. The packet may also comprise a command corresponding to an action. The action may correspond to the particular remote device. The action may comprise powering on the particular remote device, powering off the particular remote device, or restarting the particular remote device. The command, when received by a particular remote device, may cause the particular remote device to implement the action. In certain configurations, the packet may be a Wake On LAN signal, a magic packet, or other wakeup signal.

In S301, packet transmitting device 112 may transmit the packet to a first network entity 2. The first network entity 2 may comprise a router, a switch, a gateway, a bridge, or other entities that create or facilitate internetwork connections. In S302, the first network entity 2 may examine the identification data. In S303, the first network entity 2, in response to examining the identification data, may determine which network the particular remote device resides in. The particular remote device may reside in a second network 1. This second network 1 may also be referred to as the "device network." The device network may be a different network than the first network 1. For example, the first network 1 may be a LAN at a residential location and the device network may be a LAN at an office. In S304, the first network entity 2 may determine whether it serves the device network. If the first network entity 2 determines that it does not serve the device network (S304: NO), then the process may proceed to S305.

In S305, the first network entity 2 may identify a second network entity 2. The first network entity 2 may identify the second network entity 2 by using a routing table, wherein a routing table comprises routing information. The first network entity 2 may search the routing information to determine a route for the packet to travel along such that it reaches the device network. The first network entity 2 may determine that the packet must travel to one or more additional network entities 2 in order for the packet to reach the device network. The one or more additional network entities 2 may comprise the second network entity 2. The second network entity 2 may be a network entity 2 that is connected to the first network entity 2. Thus, in S301, after identifying the second network entity 2, the first network entity 2 may transmit the packet to the second network entity 2.

In certain configurations, the first network entity 2 may determine a least cost route for the packet to travel along. The first network entity 2 may use a cost table comprising routing cost information to calculate the least cost route. In other configurations, the first network entity 2 may determine a most direct route for the packet to travel along. The most direct route may correspond with a route that utilizes a smallest number of network entities and other devices to deliver the packet to its device network. In still other configurations, the first network entity 2 may determine a fastest route for the packet to travel along. In particular configurations, the first network entity 2 may determine a dynamic route for the packet to travel along; and in other configurations, the first network entity 2 may determine a static route for the packet to travel along.

Alternatively, in S305, the first network entity 2 may identify the second network entity 2 by using a default route. The default route may be used when a routing table does not contain sufficient routing information to enable the first network entity 2 to determine a route for the packet to travel along. For example, the first network entity 2 may comprise a first router. The first router may examine the identification data and determine a device network. The first router may then use a routing table to determine a route for the packet to travel along; however, the routing table may not contain routing information that corresponds to the device network. Consequently, the first router may identify a second network entity 2 using a default route. This second network entity 2 may comprise a second router.

After the packet is received by the second network entity 2, the second network entity 2 may repeat S302 through S304. In S304, if the second network entity 2 determines that it does not serve the device network (S304: NO), then the second network entity 2 may repeat S305 and S306. This process may repeat until a particular network entity 2 determines that it serves the device network. If a particular network entity 2 determines that it serves the device network (S304: YES), then the process may proceed to S306. The particular network entity 2 may serve the device network if it is connected to the device network and can transmit the packet to the particular remote device in the device network. In S306, the particular network entity 2, in response to examining the identification data, may determine a location corresponding to the particular remote device. This location may be referred to as the "device location." In S307, the particular network entity 2 may transmit the packet to the device location. The process may then terminate.

In certain configurations, S306 may be performed prior to S304. In such configurations, S303 and S306 may also be performed concurrently. Moreover, in such configurations, S303 may be omitted and S304 may be modified to determine whether a particular network entity 2 serves a device location (i.e., whether a particular network entity 2 is connected to the particular remote device and thus can transmit the packet to the particular remote device).

The flowcharts and diagrams in FIGS. 1-5 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
   transmitting, to each of one or more remote devices, a respective request for status; receiving, from each of the one or more remote devices, respective response status data comprising a respective response time;
   presenting respective response status data and one or more actions that correspond to each of one or more remote devices;
   receiving, from a user device, a selection, the selection comprising an action selected from the one or more actions, wherein the action corresponds to a particular remote device in the one or more remote devices;
   retrieving identification data for the particular remote device, wherein the identification data comprises a Virtual Local Area Network (VLAN) identifier;
   generating a packet in a first network, wherein the packet comprises the identification data and a command corresponding to the action;
   determining that the user device does not have sufficient network administrative rights to perform the action on the particular remote device;
   in response to determining that the user device does not have sufficient network administrative rights to perform the action on the particular remote device, identifying an entity in the first network that has an administrative right to manage the particular remote device, wherein the right to manage the remote device includes the right to perform the action on the particular remote device;
   mapping the packet to the entity in the first network that has the administrative right to deliver the packet to the particular remote device, wherein the particular remote device is located in a second network, wherein at least one of the first network and the second network is a VLAN;

wherein mapping the packet to the entity in the first network that has the administrative right to manage the particular remote device comprises:
  identifying a routing table;
    determining that the routing table does not contain sufficient routing information to determine a route to the entity in the first network that has the administrative right to manage the particular remove device; and
    in response to determining that the routing table does not contain sufficient routing information to determine the route, identifying a default route to the entity in the first network that has the administrative right to manage the particular remote device; and
  instructing the entity in the first network that has the administrative right to transmit the packet to the particular remote device in the second network.

2. The method of claim 1, further comprising:
  receiving a command to monitor the particular remote device, wherein the remote device comprises a printer;
  instructing a monitoring camera device to monitor the printer;
  determining that the printer is having a problem based upon the monitoring using the monitoring camera device; and
  in response to determining that the printer is having the problem, remotely powering off the printer.

3. The method of claim 1, wherein respective response status data comprises:
  a respective status state, wherein the respective status state comprises not accessible; and
  a respective statistic corresponding to a metric, wherein the metric comprises an amount of time that the remote device has been in the not accessible status state.

4. The method of claim 1, wherein the entity in the first network that has the administrative right to manage the particular remote device is configured to:
  examine the identification data;
  determine a destination for the packet in response to examining the identification data; and
  transmit the packet to the destination.

5. The method of claim 1, wherein the entity in the first network that has the administrative right to deliver the packet to the particular remote device is further configured to:
  examine the identification data;
  determine a destination for the packet in response to examining the identification data;
  determine a least cost route for delivery to the destination; and
  transmit the packet to the destination via the least cost route.

6. The method of claim 1, wherein a remote device is selected from the group comprising: a computer and an appliance.

7. The method of claim 1, wherein one or more actions comprise at least powering on a remote device, powering off a remote device, and restarting a remote device.

8. A system comprising:
  a transmitting device configured to transmit, to each of one or more remote devices, a respective request for status;
  a reception device configured to receive, from each of the one or more remote devices, respective response status data comprising a respective response time;
  a first presenting device configured to present respective response status data and one or more actions that correspond to each of one or more remote devices;
  a first receiving device configured to receive, from a user device, a selection, the selection comprising an action selected from the one or more actions, wherein the action corresponds to a particular remote device in the one or more remote devices;
  a retrieving device configured to retrieve identification data for the particular remote device, wherein the identification data comprises a Virtual Local Area Network (VLAN) identifier;
  a generating device configured to generate a packet in a first network, wherein the packet comprises the identification data and a command corresponding to the action;
  a determining device configured to determine that the user device does not have sufficient network administrative rights to perform the action on the particular remote device;
  a mapping device configured to, in response to determining that the user device does not have sufficient network administrative rights to perform the action on the particular remote device, identify an entity in the first network that has an administrative right to manage the particular remote device;
  the mapping device being further configured to map the packet to the entity in the first network that has the administrative right to manage the particular remote device, wherein the right to manage the remote device includes the right to perform the action on the particular remote device and wherein the particular remote device is located in a second network, wherein at least one of the first network and the second network is a VLAN;
  wherein mapping the packet to the entity in the first network that has the administrative right to manage the particular remote device comprises:
    identifying a routing table;
      determining that the routing table does not contain routing information that corresponds to the entity in the first network that has the administrative right to deliver the packet to the particular remove device; and
      in response to determining that the routing table does not contain sufficient routing information to determine the route, identifying a default route to the entity in the first network that has the administrative right to manage the particular remove device; and
  a first instructing device configured to instruct the entity in the first network that has the administrative right to transmit the packet to the particular remote device in the second network.

9. The system according to claim 8, further comprising:
  the first receiving device configured to receive a command to determine ambient conditions of the particular remote device;
  the first instructing device configured to instruct a monitoring camera device to determine ambient conditions of the particular remote device, the monitoring camera device in proximity to the particular remote device; and
  the first presenting device configured to present the ambient conditions of the particular remote device.

10. The system according to claim 8, wherein respective response status data comprises at least one of:
  a respective status state; and a respective statistic corresponding to a metric, wherein the metric comprises an amount of time that the remote device has been set to the respective status state.

11. The system according to claim 8, wherein the entity in the first network that has the administrative right to deliver the packet to the particular remote device is configured to:
examine the identification data;
determine a destination for the packet in response to examining the identification data; and
transmit the packet to the destination.

12. The system according to claim 8, wherein the entity in the first network that has the administrative right to manage the particular remote device is further configured to:
examine the identification data;
determine a destination for the packet in response to examining the identification data;
determine a least cost route for delivery to the destination; and
transmit the packet to the destination via the least cost route.

13. The system of claim 8, wherein a remote device is selected from the group comprising: a computer and an appliance.

14. The system of claim 8, wherein one or more actions comprise at least powering on a remote device, powering off a remote device, and restarting a remote device.

15. A computer program product comprising:
a non-transitory computer readable storage medium having computer readable program code embodied therewith, the computer readable program code comprising:
computer readable program code configured to transmit, to each of one or more remote devices, a respective request for status;
computer readable program code configured to receive, from each of the one or more remote devices, respective response status data comprising a respective response time;
computer readable program code configured to present respective response status data and one or more actions that correspond to each of one or more remote devices;
computer readable program code configured to receive, from a user device, a selection, the selection comprising an action selected from the one or more actions, wherein the action corresponds to a particular remote device in the one or more remote devices;
computer readable program code configured to retrieve identification data for the particular remote device, wherein the identification data comprises a Virtual Local Area Network (VLAN) identifier;
computer readable program code configured to generate a packet in a first network, wherein the packet comprises the identification data and a command corresponding to the action;
computer readable program code configured to determine that the user device does not have sufficient network administrative rights to perform the action on the particular remote device;
computer readable program code configured to, in response to determining that the user device does not have sufficient network administrative rights to perform the action on the particular remote device, identify an entity in the first network that has an administrative right to manage the particular remote device, wherein the right to manage the remote device includes the right to perform the action on the particular remote device;
computer readable program code configured to map the packet to the particular remote device;
wherein mapping the packet to the entity in the first network that has the administrative right to manage the particular remote device comprises:
identifying a routing table;
determining that the routing table does not contain sufficient routing information to determine a route to the entity in the first network that has the administrative right to manage the particular remove device; and
in response to determining that the routing table does not contain sufficient routing information to determine the route, identifying a default route to the entity in the first network that has the administrative right to manage the particular remove device; and
computer readable program code configured to transmit the packet to the particular remote device, wherein the particular remote device is located in a second network, wherein at least one of the first network and the second network is a VLAN.

16. The computer program product according to claim 15, further comprising:
computer readable program code configure to receive a command to determine ambient conditions of the particular remote device;
computer readable program code configure to instruct a monitoring camera device to determine ambient conditions of the particular remote device, the monitoring camera device in proximity to the particular remote device; and
computer readable program code configure to present the ambient conditions of the particular remote device.

17. The computer program product according to claim 15, wherein respective response status data comprises at least one of:
a respective status state; and
a respective statistic corresponding to a metric, wherein the metric comprises an amount of time that of the remote device has been set to the respective status state.

18. The computer program product according to claim 15, wherein the computer readable program code configured to transmit the packet to the particular remote device comprises computer reasonable program code configured to use one or more network entities to manage the particular remote device, wherein the one or more network entities is configured to:
examine the identification data;
determine a destination for the packet in response to examining the identification data; and
transmit the packet to the destination.

19. The computer program product according to claim 15, wherein the computer readable program code configured to transmit the packet to the particular remote device is further configured to:
examine the identification data;
determine a destination for the packet in response to examining the identification data;
determine a least cost route for delivery to the destination; and
transmit the packet to the destination via the least cost route.

20. The computer program product according to claim 15, wherein a remote device is selected from the group comprising: a computer and an appliance.

21. The computer program product according to claim 15, wherein one or more actions comprise at least powering on a remote device, powering off a remote device, and restarting a remote device.

* * * * *